J. RIPBERGER.
REVERSE GEAR MECHANISM.
APPLICATION FILED JAN. 31, 1912.
1,044,421.
Patented Nov. 12, 1912.
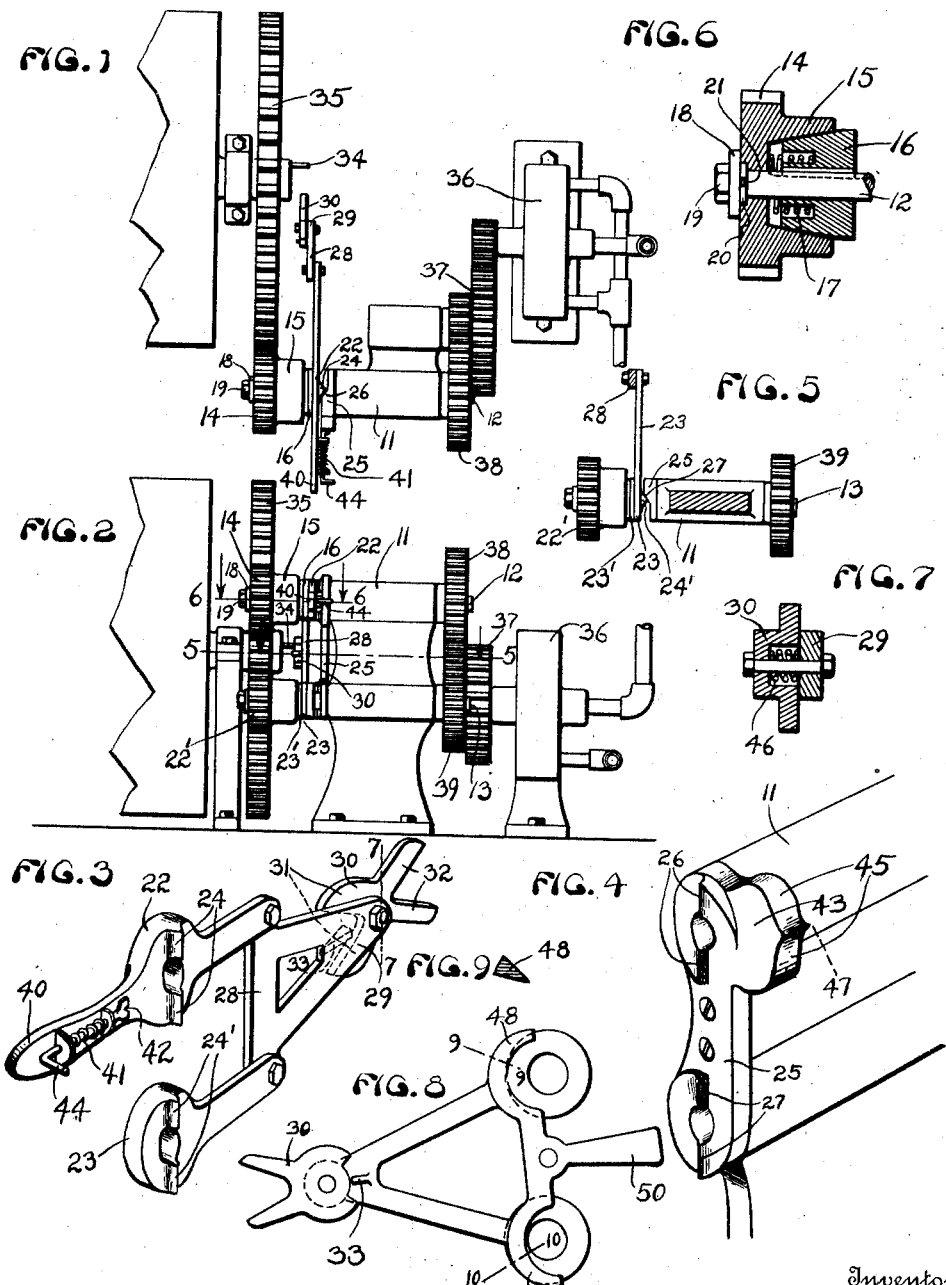

UNITED STATES PATENT OFFICE.

JACOB RIPBERGER, OF BELLEVUE, KENTUCKY, ASSIGNOR TO CONRAD A. WISSEL, OF DAYTON, KENTUCKY.

REVERSE-GEAR MECHANISM.

1,044,421.

Specification of Letters Patent.

Patented Nov. 12, 1912.

Application filed January 31, 1912. Serial No. 674,480.

*To all whom it may concern:*

Be it known that I, JACOB RIPBERGER, a citizen of the United States of America, and a resident of Bellevue, in the county of Campbell and State of Kentucky, have invented a certain new and useful Improvement in Reverse-Gear Mechanism for Motors and Engines, of which the following is a specification.

My invention relates to improvements in reversing mechanism, and it has for one of its objects a gear mechanism to reversely-drive a wash-tub, elevator or the like without reversing the motor or driving-engine.

Another object is a reversing gear mechanism wherein the operation of reversing the direction of the driven device is accomplished without reversing the driving-means and without any possible injurious shock or danger of damaging the gears.

A still further object is a reversing gear mechanism wherein the operation of reversing the motion of the driven-member may be either automatically or manually performed.

These and other objects are attained in the apparatus described in the following specification and illustrated in the accompanying drawings, in which:—

Figure 1 is a plan view of the apparatus embodying my invention herein, showing it in connection with driving-means and a driven-member; Fig. 2, a side elevation of the mechanism illustrated in Fig. 1; Fig. 3, a perspective view of a detail of the reversing mechanism; Fig. 4, a perspective view of a detail of the reversing mechanism; Fig. 5, a sectional view on line 5—5, of Fig. 2; Fig. 6, a sectional view of a clutch-member on line 6—6, of Fig. 2; Fig. 7, a sectional view on line 7—7, of Fig. 3; Fig. 8, an elevation of a modified form of cam-plate; and Figs. 9 and 10, sections on lines 9—9 and 10—10, respectively, of Fig. 8.

The improved reversing mechanism comprises two pinions each loosely mounted upon separate shafts, cone-clutch members splined on said shafts and adapted to engage correspondingly formed recesses within the pinions, rotatively-mounted reciprocating clutch-operating cam-plates mounted on said shafts, bearings for said shafts and intermeshing gears secured to said shafts, said intermeshing gears connected with a driving-member, and clutch-controlled pinions connected with the driven-member or vice versa.

A double bearing 11, in which is rotatively mounted an upper shaft 12 and a lower shaft 13, is the means employed for supporting the reversing mechanism. Upon shaft 12 is mounted a loose pinion 14 which is formed with a hub 15. This hub is conically-recessed to permit a cone-clutch member 16 to engage such recess. Clutch-member 16 is splined to shaft 12 so that it may be reciprocated lengthwise along the shaft and at the same time be rotatively driven by it. A compression-spring 17 (Fig. 6) is provided within the clutch formed by members 15 and 16, to normally hold the cone 16 out of engagement with the recessed hub. A thrust upon the pinion is occasioned by the engagement of the clutch-member 16 with member 15 and is taken up by a washer 18 that is held against the end of the shaft by a cap-screw 19. Washer 18 is held against relative rotation with shaft 12 by forming a short sleeve 20 integrally with the washer and notching the sleeve so that it will slip over a pin 21 secured within the shaft. This prevents the cap-screw from being unscrewed from the shaft by the rotation of the washer, the washer rotation being caused by the rotation of the pinion in alternate directions. Upon lower shaft 13 is a loose pinion 22', which is provided with a cone-clutch 23', the construction of the pinion and its clutch being identical with that of pinion 14 and its clutch-members 15 and 16.

Between the end of the double bearing 11 and exposed ends of the clutch-members 16 and 23' and also mounted loosely upon shafts 12 and 13 are cone-operating plates 22 and 23 that have cam-like projections 24 and 24' formed thereon. Secured to the end of the upper bearing is a plate 25 that has inclined lugs 26 and 27 formed upon its surface, (as shown in Fig. 4) the respective lugs being oppositely inclined to each other. The projections 24 and 24' of plates 22 and 23, respectively, are adapted to bear against plate 25, projections 24 bearing against lugs 26 at the time that projections 24' are free from lugs 27, or vice versa. The alternate operation above described is accomplished by connecting plates 22 and 23 by means of a link 28 that causes both plates to rock in unison upon shafts 12 and 13. Link 28 is formed with an extension 29 upon which is rotatively mounted a trip-lever 30. This trip-lever is frictionally-restrained by means of a spring 46 (Fig. 7) and is formed with two or more forks or bifurcated sets of fingers 31 and 32. Fingers or forks 31 extend rearwardly toward the cone-operating plates and are adapted to engage a lug 33 formed on extension 29, to limit the movement of the trip 30. Fingers or forks 32 extend outwardly in line with a pin 34 secured to the hub or other portion of a main driven-gear 35 and are adapted to be contacted by said pin 34.

In operation, the power is transmitted from any suitable source, such as a rotary engine or the like, through gear 37 and into gears 38 and 39 secured to shafts 12 and 13, thus causing the shafts to rotate in opposite directions. The power is thence transmitted to cones 16 and 23' that are spring-pressed against plates 22 and 23. For example, in one position the pressure of cone 16 against plate 22 causes projections 24 to contact with lugs 26 and the pressure of cone 23' against plate 23 causes projections 24' to contact with the plane surface of bearing-plate 25, so that projections 24' are just in position to ride upon lugs 27. In the above-described position, cone 16 is in engagement with its corresponding clutch-member 15 and pinion 14 is locked to shaft 12, thus becoming the driving-pinion. While pinion 14 is driving the gear 35, pinion 22' is running loosely in the same direction as said pinion 14 upon shaft 13 that is rotating in the opposite direction. As the large driven-gear 35 travels through one revolution, the pin 34 contacts the lower one of the fingers 32 and brings the lower one of the fingers 31 into engagement with lug 33 on extension 29. The pin now passes on and in its second revolution with trip 30 it contacts the upper one of the fingers 32 and moves both plates 22 and 23 so that the movement of plate 22 causes projections 24 to leave lugs 26, thus releasing cone 16 from pinion 14 and the movement of plate 23 causes projections 24' to ride upon lugs 27, thus pressing cone 23' into engagement with pinion 22' and making it the driving-pinion, giving opposite rotation to gear 35 while pinion 14 runs free. The direction of rotation of the large driven-gear 35 is again reversed by the contacting of pin 34, first with the upper one of the fingers 32 and then with the lower one, in this manner again making pinion 14 the driving-pinion.

In order to stop the driven-gear 35 without stopping the engine 36, a handle 40 is provided on plate 22 so that the clutches may be moved to the neutral position manually. This handle is provided with a spring-pressed latch 41, which is notched at 42 so that the notch will engage the pointed end 47 of an ear 43 extending from plate 25. In order to prevent the reversing mechanism from becoming locked in the neutral position at each alternate engagement of pin 34 with one of the fingers 32, the latch-handle 44 is turned downwardly so that the broad edge of the latch may ride over the entire surface 45 of ear 43 without stopping. The movement of latch 41 from one side to the other of ear-point 47, along the surface 45, causes the plates 22 and 23 to be yieldingly-held in the alternate positions in which they are placed.

In Fig. 8 is shown a modification of plates 22 and 23, the two members 48 and 49 of the modification being wedge-shaped as shown in the sections, Figs. 9 and 10. In using this modification, the ends of the bearings would be made plain, since no inclined lugs would be needed. The handle 50 can be used to move the clutches to the neutral positions.

In order to provide a quick reverse and a slow forward movement to the driven machinery, a different ratio to gears 38 and 39 can be used.

I claim:—

1. A reversing gear mechanism comprising oppositely-rotating driving-members, loosely-mounted pinions on said driving-members, a driven-member, a pair of clutches for said loosely-mounted pinions and means actuated by said driven member for alternately engaging and disengaging one clutch to respectively drive or set free one pinion and for alternately disengaging and engaging the other clutch to respectively set free or drive the other pinion.

2. A reversing gear mechanism comprising a driving-member, a driven member and means interposed between said driving and said driven members to reverse said driven-member, said reversing means comprising pinions which continually mesh with the driven-member, oppositely-rotating shafts upon which the pinions are loosely mounted, clutches upon the shafts to engage said pinions and means actuated by said driven-member for engaging one clutch and disengaging the other, simultaneously, or vice versa.

3. The combination of a driving-member, a driven-member and means interposed between the said driving-member and the said driven-member to reverse the motion of the driven-member, said means being actuated by the driven-member and comprising two oppositely-rotating shafts, a pinion loosely-mounted upon each shaft, said pinions continually meshing with the driven-member and a clutch mounted adjacent to each pinion, a clutch-operating plate located adjacent to each clutch and means operated from the driven-member to operate said clutch-operating plates.

4. A reversing gear mechanism comprising a driving-member, a driven-member, a master-gear on said driven-member, pinions intermeshing with said master-gear, clutch-cones engaging said pinions, spring cushions between said pinions and clutch-cones and cams adapted to connect said clutch-cones with the driving-member.

5. A reversing gear mechanism comprising a driving-member, a driven-member, means for reversely-driving said driven-member without reversing said driving-member and a trip for operating said means from said driven-member, said trip comprising a double-forked member yieldingly-mounted on said reverse-driving means and adapted to be rotated and set by said driven-member.

JACOB RIPBERGER.

Witnesses:
CONRAD A. WISSEL,
JOHN ELIAS JONES.

---

Copies of this patent may be obtained for five cents each, by addressing the "Commissioner of Patents, Washington, D. C."